Figure 1:
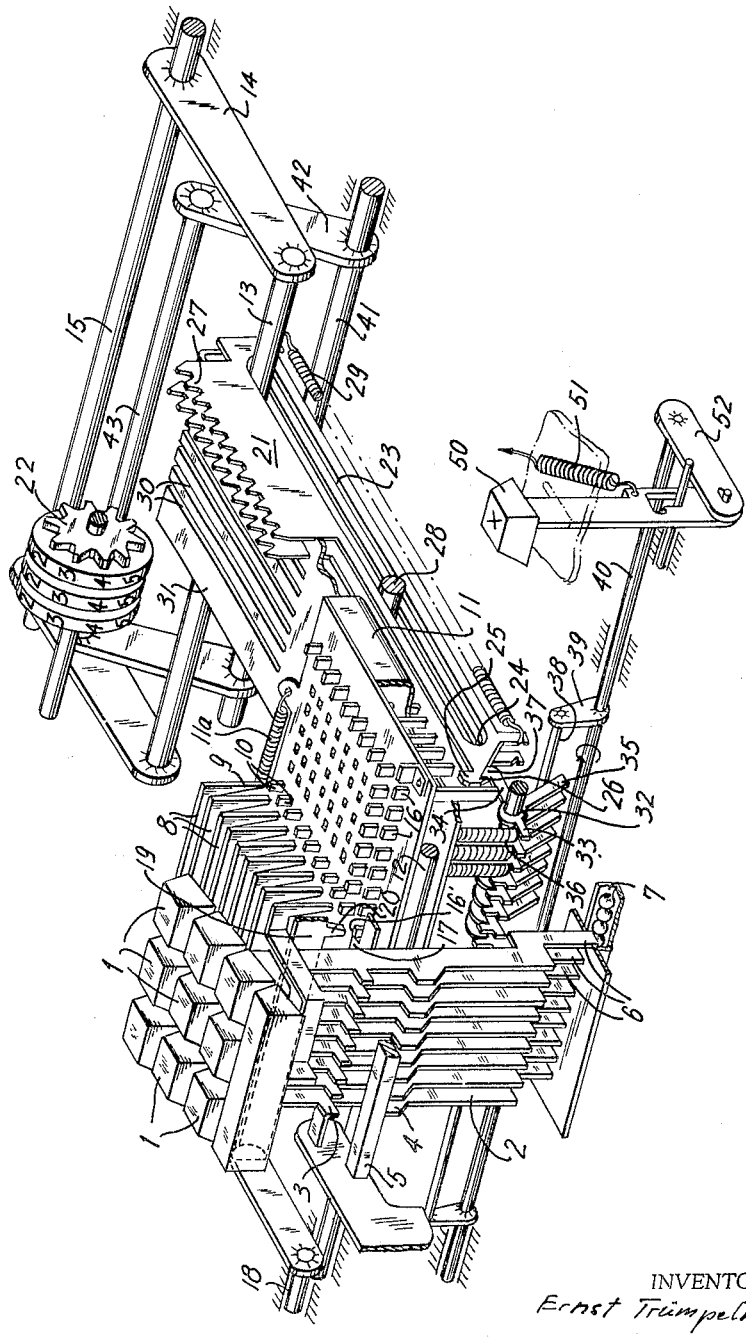

Sept. 11, 1962  E. TRÜMPELMANN  3,053,443
INPUT ARRANGEMENT FOR TEN-KEY CALCULATORS
Filed Aug. 24, 1961  2 Sheets-Sheet 1

INVENTOR.
Ernst Trümpelmann
BY
Michael S. Striker

Sept. 11, 1962     E. TRÜMPELMANN     3,053,443
INPUT ARRANGEMENT FOR TEN-KEY CALCULATORS
Filed Aug. 24, 1961     2 Sheets-Sheet 2

INVENTOR.
Ernst Trümpelmann
BY
Michael S. Striker
Attorney

United States Patent Office 3,053,443
Patented Sept. 11, 1962

3,053,443
INPUT ARRANGEMENT FOR TEN-KEY
CALCULATORS
Ernst Trümpelmann, Balingen-Wurttemberg, Germany, assignor to Olympia Werke A.G., Wilhelmshaven, Germany
Filed Aug. 24, 1961, Ser. No. 133,739
Claims priority, application Germany Aug. 30, 1960
9 Claims. (Cl. 235—60)

The present invention relates to an input arrangement for ten-key calculators, and more particularly to an arrangement in which numerical values are entered into the counter means of a ten-key calculator by elements mounted on the pin carriage of the calculator.

In conventional ten-key calculators, the numerical value set in the pin carriage is sensed by feeler members which are mounted in the stationary part of the machine. The sensing of the pin carriage takes place during the first half of the machine cycle, whereupon the sensing members are brought into engagement with counter means, and returned to the initial position of rest so that the counter means are set to represent the numerical value. An increase of the operational speed of calculators of this type, is only possible if the number of machine cycles per time unit is increased. An increase of the operational speed is, however, limited, since a minimum time is required for performing the necessary functions of the elements in a reliable manner. Furthermore extremely rapid operation of the machine causes excessive wear of the parts, or damage to the same due to the required greater accelerations.

It is one object of the present invention to provide an input arrangement for a ten-key calculator which overcomes these disadvantages of the prior art constructions, and in which the sensing movements of the feeler members are terminated before the start of the machine cycle.

Another object of the present invention is to provide an input arrangement for ten-key calculators by which additions, subtractions, multiplications, and divisions can be carried out.

Another object of the present invention is to provide an input arrangement for ten key calculators in which the denominational members by which numerical values are transferred from the pin carriage to the counter and totalizer means, are mounted on the pin carriage.

Another object of the invention is to provide a ten-key calculator in which each sensing member performs a sensing movement directly after actuation of a key so that the sensing members successively assume digit representing positions as the pin carriage moves step by step between denominational positions.

With these objects in view, one embodiment of the invention comprises a pin carriage having denominational sets of pin carriage stops movable to and from actuated positions; a totalizer including a denominational set of counter means preferably including gears; a set of denominational feeler members, preferably having rack portion cooperating with the gears of the counter means, and being mounted on the pin carriage for movement between a normal position located spaced from the counter means and in the region of the pin carriage stops, and a counter controlling position in operative engagement with the counter means. Each denominational feeler member is mounted on the pin carriage for movement over one of the counter means and over one of the sets of pin carriage stops between a plurality of digit representing positions. The direction of movement of the feeler members between the digit representing positions is transverse to the direction of movement to and from the counter controlling position.

Operating means move the denominational feeler members in a selected sequence between the positions thereof so that the denominational feeler members are stopped by the pin carriage stops in the digit representing positions and then assume the counter controlling position to set the counter means to corresponding digit representing positions.

In the preferred embodiment of the present invention, the operating means include first operating cam means for effecting a forward stroke and a return stroke of the denominational feeler members in such a manner that the forward strokes are terminated by pin carriage stops in the actuated position, and second operating cam means effect movement of the feeler members at the end of the forward stroke to the counter controlling position so that the counter means are set to digit representing positions during the return stroke of the feeler members.

Since the denominational feeler members are mounted on the pin carriage, they actually move in three directions, namely with the pin carriage, transverse to the direction of movement of the pin carriage between digit representing positions, and finally in a plane perpendicular to the above mentioned directions to and from the counter controlling position. The denominational sensing members are turnably mounted on the pin carriage to perform the last-mentioned movement and in order to permit the denominational sensing members to simultaneously turn and move in longitudinal directions, the feeler members have longitudinal slots through which a shaft mounted on the pin carriage passes.

Locking means are provided for locking the feeler members in a position of rest after the return stroke has been completed. Preferably, a multiplication key is connected to the locking means to hold the same in an inoperative position during a multiplication, so that the feeler members are free to perform repeated forward and return strokes for entering the same numerical value repeatedly enter the totalizer and counter means.

Figure 2:
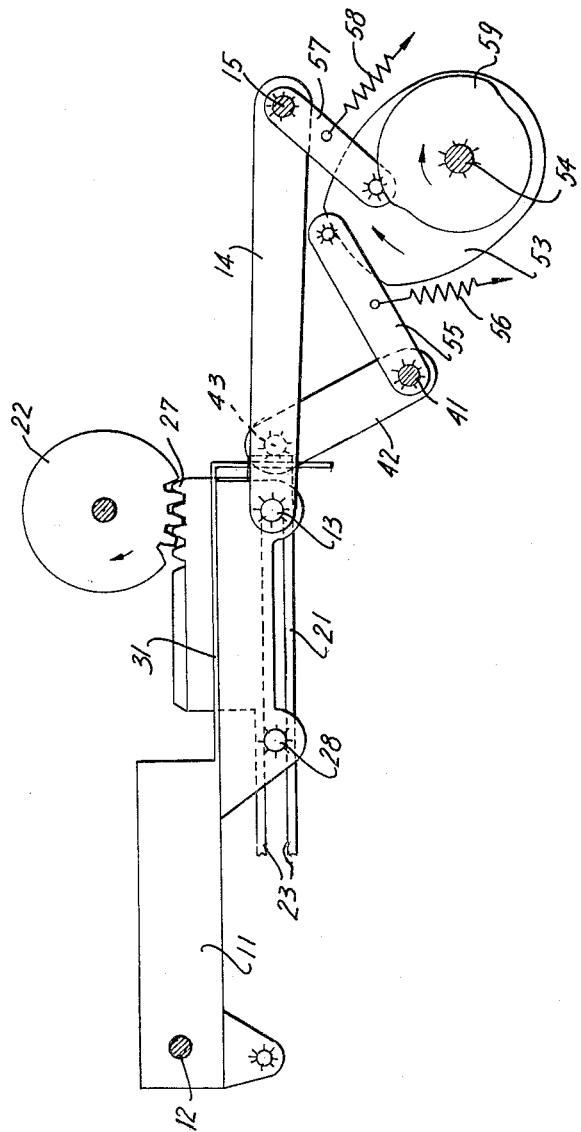

The novel features which are cnosidered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective view illustrating an embodiment of the present invention; and FIG. 2 is a fragmentary side view of the embodiment of FIG. 1, illustrating the operational position in which a numerical value is transferred to the counter means, and showing operating cam means omitted in FIG. 1 for the sake of clarity.

Referring now to the drawings, a ten-key calculator has a keyboard with keys 1 having key shanks 2 provided with projections 3 and 4 cooperating with a stop bar 5 to limit the movement of keys 1 in two end positions. Shanks 2 have end portions 6 cooperating with a ball lock 7. When one of the keys 1 is depressed, the respective projections 6 enters between a pair of adjacent balls so that the balls spread to a position in which the balls at the end of the row abut corresponding abutments. Consequently, no other projection 6 can enter between the balls so that two keys 1 cannot be simultaneously depressed.

The keys 1 associated with the digits from 0 to 8 have projections 8 terminating in portions 9 which respectively register with corresponding pin stops 10 which are also associated with the digits from 0 to 8. A plurality of sets of pin carriage stops 10 is provided, each set being associated with a different decimal order. The digit 9 is not represented by a pin carriage stop 10, and transfer of the digit 9 to the totalizer is effected in a different manner which will be described hereinafter.

Pin carriage 11 is mounted on two guide shafts 12 and 13 for movement along the same between positions associated with different orders of a numerical value. A spring 11a is connected to the pin carriage 11 and urges the same to move to the left as viewed in FIG. 1. A denominational set of control stop members 16 is mounted on the pin carriage 11 for movement between the illustrated blocking position, and a downwardly depressed position. As shown in FIG. 1, the first control stop member 16' abuts a stationary abutment member 20 which is mounted on the stationary frame of the machine, and prevents movement of the pin carriage under the action of spring 11a.

An angular member 19 is mounted on a shaft 18 and has a projection 20 located directly above control stop member 16'. Member 19 has a portion extending under all projecting parts 8 of keys 1, so that upon depression of any key 1, member 19 is also depressed so that portion 20 pushes control stop member 16' downwardly out of its blocking position and to a position releasing abutment member 17. Consequently spring 11a pulls the pin carriage one step until abutment 17 is engaged by the next following control stop member 16 of the second decimal order. In this position, portions 9 are located over the set of pin stops 10 associated with the second decimal order, and projection 20 is located over the control stop member 16 associated with the second decimal order. When a key 1 is depressed in this position of the pin carriage to set a digit representing pin stop 10 to an actuated position, releasing member 19, 20 will be operated simultaneously to effect another stepwise movement of the pin carriage.

While the guide shaft 12 passes through bearing means on the pin carriage 11 proper, the guide shaft 13 passes through elongated slots 23 in a denominational set of feeler members 21 which are mounted for longitudinal movement in slots 30 of a wall 31 of the pin carriage 11. A shaft 28, which is secured to the pin carriage 11, also passes through the slots 23 of the denominational members 21. Each member 21 has a pair of projections 25 and 26 at one end, and a rack portion 27 at the other end thereof. The rack portions 27 cooperate with gears 92 of the counter means of a totalizer and are correspondingly spaced. It will be understood that a counter means 22 is provided for each decimal order of the machine, and that the counter means 22 are connected to each other by tens-transfer means to form the totalizer.

Each member 21 is held in the normal position of rest illustrated in FIG. 1 by an arresting member 32. Each arresting member 32 has an arm 35 with a latch portion 37 engaging the projection 26 of the respective member 21, another arm 33 which is loaded by a pressure spring 36, and a third arm 35 abutting a rod 38 which is mounted on a pair of arms 39 on a turntable shaft 40. A multiplication key 50 is loaded by spring 51 and connected by lever 52 to shaft 40 to turn the same with arms 39 so that rod 38 turns all arresting members 32 to positions in which latch portions 37 release projections 26 of members 21.

A shaft 41 is turnably mounted in the frame of the machine, and has a pair of fixed arms 42 on which a return bar 43 is mounted. As shown in FIG. 2, return bar 43 is controlled by cam 53 mounted on a drive shaft 54 which is driven by a motor. A cam follower arm fixed on shaft 41 is urged by a spring 56 against cam 53 so that during rotation of cam 53, members 42, 55 and 43 perform a reciprocating movement. During movement of return bar 43 to the left as viewed in FIG. 2, return bar 43 engages the end portions of members 21 and moves the same to the left as viewed in FIGS. 1 and 2 against the action of springs 29 which are secured to hook-shaped projections of members 21. In the position illustrated in FIG. 1, however, springs 29 cannot pull the associated members 21 to the right, since the same are arrested by arresting members 32.

Guide shaft 13, which passes through slots 23 of members 21, is mounted on a pair of arms 14 fixed on a shaft 15 to which a cam follower 57 is secured. A spring 58 urges cam follower 57 against another cam 59 fixed on the driven shaft 54, so that guide shaft 13 performs an up and down movement under control of cam 59. Since cams 53 and 59 are mounted on the same shaft 54, the reciprocating motion of return bar 43, and the reciprocating motion of guide shaft 13 are synchronized.

The apparatus operates as follows: When any of the keys 1 representing one of the digits from 0 to 8 is depressed, the corresponding actuating portion 8, 9 moves to an actuating position and pushes the respective pin stop 10 to an actuating position located in the same vertical plane as the shoulder of projection 25 of member 21 of the unit order. At the same time, releasing member 19 is turned with shaft 18 since it is crossed and actuated by a shank portion of the respective key. Control stop member 16' of the unit order is engaged by projection 20 and pushed down to a position releasing abutment member 17, and during this movement control stop member 16' engages arm 35 of the arresting member of the unit order, and turns arresting member 32 in clockwise direction to a position in which latch portion 37 releases projection 26 of member 21 of the unit order so that the respective spring 29 pulls member 21 in a forward stroke to the right as viewed in FIG. 1 until projection 25 engages the pin stop 10 which was set to an actuated position to represent a digit. Consequently, the new position of member 21 of the unit order at the end of the forward stroke represents the digit of the actuated key 1.

Movement of the pin carriage 11, 31 with members 21 under the action of spring 11a starts as soon as projection 20 releases abutment member 17 upon return of the respective key 1 to its normal position so that each member 21 moves to the digit representing position while the pin carriage moves to the next order, resulting in an increase of the speed of the machine as compared with conventional ten-key calculators. During the movement of member 21, guide shaft 13 is not raised by cam 59 so that the forward stroke of member 21 between its position of rest and the respective digit representing position takes place in the normal position of member 21 in which the rack portion 27 thereof is spaced from gear 22.

When the first actuated key 1 is released, projection 20 is withdrawn and releases abutment 17, and since control stop member 16' is still located below abutment member 17, spring 11a pulls the pin carriage 11, 31 with all members 21 one step to the left as viewed in FIG. 1 until the upper portion of control stop member 16 of the second decimal order engages abutment member 17 and stops the pin carriage in a position in which the row of pin stops 10 of the second decimal order is located underneath the actuating projections 9 so that a digit can now be introduced into the second decimal order by operation of one of the keys 1 while at the same time control stop member 16 of the second decimal order is displaced to release abutment 17, as above described for control stop member 16'. In this manner, any numerical value can be first introduced into the pin carriage, and then transferred to the set of denominational member 21 which successively assume digit-representing positions to represent all orders of the numerical value.

If the digit 9 is to be introduced in any one of the orders, key 1 representing digit 9 is depressed. As mentioned above, no pin stop 10 is provided for the digit 9, but member 19 is depressed when the respective key 1 is operated, and displaces the corresponding control stop member 16 which releases through arresting lever 32 the respective denominational member 21 for movement in a forward stroke. The end face 24 of slot 23 of each member 21 is positioned relative to the stationary guide shaft 28 in such a manner that shaft 28 stops the forward stroke of any member 21 by engaging the end face 24, unless the member 21 was stopped before that by engagement of an actuated pin stop 10 by its projection 24. Consequently, engagement between guide shaft 28 and end face 24 is the farthest position a member 21 can assume at the end of the forward stroke under the action of spring 29, and this position represents the digit 9.

During the introduction of the numerical value, cam 53 holds cam follower 55 in a position in which return bar 43 is held in an inoperative position in which it does not interfere in any manner with the forward strokes of the denominational members 21 to digit-representing positions.

At the beginning of a machine cycle, a dwell of cam 59 turns cam follower 57 and arms 14 so that guide shaft 13 is raised and turns the denominational members 21 about shaft 28 to a counter controlling position in which the racks 27 of members 21 mesh with corresponding gears 22 of a set of counters of which the totalizer is formed, only one gear 22 and number wheel being shown in FIG. 1 for the sake of simplicity.

Cam 59 has a circular portion so that during further turning movement of the driven cam shaft 54, guide shaft 13 remains in its raised position, and holds members 21 in the counter controlling position in which racks 27 mesh with gears 22. During such further turning movements of cam shaft 54, a dwell of cam 53 engages cam follower 55 and turns shaft 41 and arms 42 in counterclockwise direction as viewed in FIG. 2 so that return bar 43 moves to the left as viewed in FIG. 2, engages the ends of members 21 in digit-representing positions and moves all members 21 in return strokes until projections 26 pivot arresting members 32 in clockwise direction whereupon springs 36 snap latch portion 37 into arresting engagement with the shoulders of projections 26 so that all members 21 are again in the initial position of rest. It is evident, that return bar 43 first engages those members 21 which represent the higher digits and then members 21 which represent lower digits. At the end of the return stroke, however, all members 21 are aligned by return bar 43 and arrested by arresting members 32.

Since during the return stroke of members 21, each member 21 moves a distance corresponding to the represented digit, at the end of the forward stroke, the respective gear 22 of the respective counter is turned through a corresponding angle to a digit-representing position so that the numerical value is now introduced into the totalizer. When the racks 27 have performed their function, a sloping portion of cam 59 controls cam follower 57 so that guide shaft 13 is lowered from the position of FIG. 2 to the position of FIG. 1 at the end of the return stroke and moves members 21 from the higher counter controlling position of FIG. 2 to the lower normal position of FIG. 1, whereupon another circular cam portion of smaller diameter on cam 59 engages cam follower 57 so that the forward stroke of members 21 takes place in the normal lower position of the same.

During additions and subtractions, the numerical value is introduced into the totalizer only once. The totalizer is of conventional construction and is provided with intermediate gears, not shown, so that the direction of rotation of the gears 22 of the totalizer can be reversed in a conventional manner for a subtraction, or for a division.

When a multiplication or division is to be carried out, it is necessary to repeatedly add the introduced numerical value in the totalizer. When the repeat key 50 is depressed, arm 52 turns and turns shaft 40 with arms 39 and rod 38 in counterclockwise direction so that all arresting members 32 are turned in clockwise direction to a position in which latch portion 37 are not located in the path of movement of projections 26. Consequently, at the end of the return stroke of members 21 under the action of return bar 43, latch portions 37 cannot snap over portions 26 to arrest members 21 in the initial position of rest, and when return bar 43 moves to the right under the action of spring 56 while cam follower 55 rides on a reduced portion of cam 53, all members 21 are simultaneously pulled by springs 29 to follow return bar 43 in a forward stroke until members 21 are stopped by the pin stop 10 which are still in the set position representing a numerical value, and effect stopping of members 21 in corresponding digit representing positions by engaging projections 24. When return bar 43 moves again to the left under control of cam 53, members 21 perform again a return stroke while being raised by guide shaft 13 to the counter controlling position so that the numerical value is introduced a second time into the totalizer while racks 27 turn the gears 22 of the counters. As long as the multiplication key 50 is held depressed, this operation is automatically repeated during the successive revolutions of cams 53 and 59. When the multiplication key 50 is released, spring 51 returns the corresponding members to a position in which rod 38 releases all arresting members 32 so that members 21 are again arrested by latch portions 37 under the action of springs 36 when arriving in the initial position of rest. FIG. 2 illustrates the operational position of the apparatus at the end of the return stroke where members 21 were brought back by return bar 43 to the position of rest, while still being raised by guide shaft 13 to the counter controlling position in which racks 27 engage gears 22. Thereupon, further turning of shaft 54 will effect lowering of guide shaft 13, separation of the racks 27 from gears 22, and thereafter movement of return bar 43 to the right as viewed in FIG. 2 to release the arrested members 21.

From the above description it will become apparent, that members 21 are movable in three directions, namely with the pin carriage 11, 31 along guide shafts 12, 13, in longitudinal direction thereof across shafts 28 and 13, and up and down with guide shaft 13 while turning about shaft 28. In the arrangement of the invention, the denominational members which serve to transfer the numerical value from the pin carriage to the totalizer are part of the pin carriage unit which can be separately assembled and then mounted in the machine so that the manufacture of a ten-key calculator is simplified as compared with conventional constructions. The arrangement of the present invention also permits a greater operational speed than the conventional constructions.

It will be understood that each of the elements described above, or two or more together, may also find a useful application in other types of ten-key calculators differing from the types described above.

While the invention has been illustrated and described as embodied in an input arrangement for ten-key calculators in which numerical values are transferred from the set pins of the pin carriage to the totalizer by denominational members mounted on the pin carriage and moving with the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a ten-key calculator, in combination, a pin carriage having denominational sets of pin stops movable to and from actuated positions; a set of keys mounted on said pin carriage and operating said pin stops; a totalizer including denominational counter means; a set of denominational members mounted on said pin carriage for movement in a first direction between a normal position located spaced from said counter means and a counter controlling position in operative engagement with said counter means, each denominational member being mounted on said pin carriage for movement in a second direction over one of said sets of pin stops between a position of rest and a plurality of digit representing positions; a set of denominational arresting levers respectively cooperating with said denominational members, each arresting lever having a releasing position and an arresting position arresting the corresponding denominational member in said position of rest, said arresting levers being operated by actuated keys to move to said releasing position; first operating means including spring means for effecting a forward stroke of said denominational members in said second direction out of said position of rest and cyclically operating return member for moving said denominational members in a return stroke to said position of rest, said forward stroke being terminated by pin stops in said actuated position so that said denominational members assume digit representing positions at the end of said forward stroke; and second operating means including a cyclically operating member engaging said denominational members for moving said denominational members at the beginning of said rearward stroke from said normal position to said counter controlling position so that said counter means are set to digit representing positions during said return stroke of said denominational members, said denominational members are bars having longitudinal slots and rack portions; wherein said counter means include gears in meshing engagement with said rack portions when said denominational members are in said counter controlling position; and wherein said cyclically operating member of said second operating means is a guide shaft passing through said slots of said denominational members, and including another guide shaft fixedly secured to said pin carriage and passing through said denominational members for turning movement between said normal position and said counter controlling position, said guide shafts guiding said denominational members during movement in said second direction under control of said spring means and return member.

2. A ten-key calculator as set forth in claim 1 wherein nine pin stops are provided; and wherein said denominational members are stopped during a forward stroke by engagement between said other guide shaft and the end of said slot.

3. A ten-key calculator as set forth in claim 1 and including a repeat key; and a control rod extending along said arresting levers and being operated by said multiplication key to move said arresting levers to said releasing position so that said denominational members are not arrested by said arresting levers in said position of rest and repeat the forward and return strokes under control of said spring means and return member until release of said multiplication key; said arresting levers being spring-biased to move to said arresting position.

4. A ten-key calculator as set forth in claim 3 and including a shaft mounted on said pin carriage and supporting said arresting levers for angular movement between said releasing and arresting positions, each arresting lever having a first arm cooperating with said rod, and a second arm having a latch portion; each denominational member having a projection cooperating with said latch portion, said projection having an inclined face to turn the respective arresting lever momentarily to said releasing position at the end of the return stroke of the denominational member, and a shoulder engaged by said latch portion in said arresting position of said arresting levers.

5. A ten-key calculator as set forth in claim 1 wherein said first operating means include a cam, a cam follower cooperating with said cam, and means connecting said cam follower with said return member; and wherein said second operating means include another cam, and another cam follower cooperating with said other cam and being connected to said guide shaft for actuating the same, said cams being connected to each other for synchronous rotation.

6. A ten-key calculator as set forth in claim 5 and including a driven shaft fixedly carrying said cams and connecting the same for synchronous rotation.

7. A ten-key calculator as set forth in claim 5 and including two shafts respectively carrying said cam followers, a pair of arms on each of said shafts, said return member extending between and being supported on one of said pair of arms, and said first-mentioned guide shaft extending between and being supported on the other pair of arms.

8. A ten-key calculator as set forth in claim 1 and including guide shaft means supporting said pin carriage for movement in a third direction between a plurality of positions associated with different orders; spring means connected to said pin carriage for moving the same in said third direction; a stationary abutment; a set of denominational control stop members mounted on said pin carriage for movement between a releasing position and a blocking position for engaging said abutment during movement of said pin carriage in said third direction; and a releasing member controlled by said keys to move a control stop member engaging said abutment from said blocking position to said releasing position so that said pin carriage moves stepwise with said denominational members, said control stop members respectively engaging the correlated arresting levers during movement from said releasing position to said blocking position to move the respective arresting lever from said arresting position to said releasing position whereby said pin carriage and the respective denominational member are simultaneously released whereby said denominational member moves to said digit representing position in said second direction while said pin carriage moves one step in said third direction, said denominational members are elongated bars, each denominational member having a longitudinally extending slot, a projecting shoulder at one end cooperating with the correlated arresting lever, and a rack position at the other end, said cyclically operating return member being a return bar engaging said other ends of said denominational members to control movement of the same in said second direction; said cyclically operating member of said second operating means being a guide shaft passing through said slots in said third direction; and another guide shaft fixed on said pin carriage and passing through said slots of said denominational members to support said denominational members for turning movement in said first direction under control of said first-mentioned guide shaft, said guide shafts slidably supporting said denominational members during movement of the same with said pin carriage in said third direction.

9. A ten-key calculator as set forth in claim 8 wherein said pin carriage includes a wall having parallel slits extending in said second direction, each of said slits slidably guiding one of said denominational members.

References Cited in the file of this patent
UNITED STATES PATENTS

| | | |
|---|---|---|
| 2,034,345 | Kottman | Mar. 17, 1936 |
| 2,753,111 | Tancred | July 3, 1956 |
| 2,832,530 | Chall | Apr. 29, 1958 |